Figure 1:
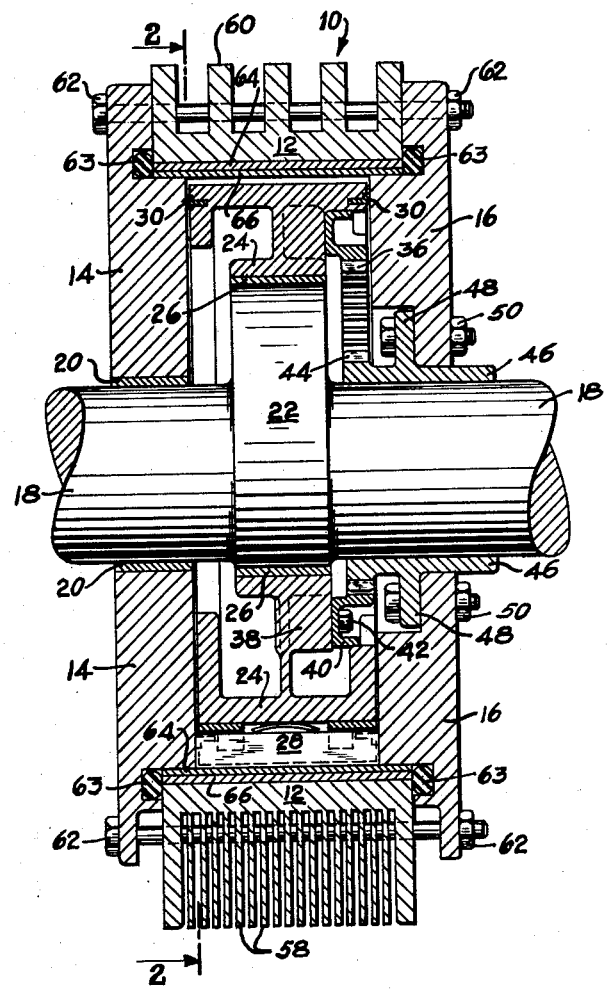

INVENTOR.
MAX BENTELE

INVENTOR.
MAX BENTELE
BY Julian Falk
ATTORNEY

United States Patent Office 3,155,313
Patented Nov. 3, 1964

3,155,313
ROTOR HOUSING CONSTRUCTION OF ROTATING COMBUSTION ENGINE
Max Bentele, Ridgewood, N.J., assignor to Curtiss-Wright Corporation, a corporation of Delaware
Filed Oct. 1, 1962, Ser. No. 227,507
8 Claims. (Cl. 230—238)

This invention relates to rotary combustion engines and in particular to rotary combustion engines wherein the engine housing is formed from a light weight material such as, for example, aluminum, aluminum alloy, magnesium, or magnesium alloy, said materials being hereinafter referred to as a light alloy material, and is provided with a wear resistant liner on its inner surface. Although the invention will be described in relation to rotary combustion engines, it is equally applicable to other rotary mechanisms such as fluid motors and compressors and it is not intended that the invention be limited to rotary combustion engines. A rotary combustion engine as described herein may be of the type disclosed in United States Patent 2,988,065 issued to Felix Wankel et al.

In general, engines of this type comprise an outer body formed by a peripheral wall interconnected by a pair of parallel end walls thereby defining a cavity whose peripheral shape preferably is basically an epitrochoid. A rotatably mounted rotor is supported on a shaft within the cavity the outer surface of which defines a plurality of circumferentially-spaced apex portions having radially movable seal strips mounted therein for sealing engagement with the inner surface of the peripheral wall thereby forming working chambers which upon relative rotation of the outer body and rotor vary in volume. An intake port is provided which admits air or a fuel-air mixture for supplying the combustion zone of said engine, and an exhaust port is provided for expelling the burnt gases from said engine and an ignition means may be provided for ignition of the fuel-air mixture whereupon the stages of intake, compression, expansion and exhaust may be carried out. Of course, it should be understood that the ignition means may be eliminated and suitable means provided for operating the engine as a diesel engine.

It has been known in the past to form internal combustion engine housings in low performance engines from light alloy materials. Due to the low performance characteristics of these engines, it is not normally necessary to provide any special means for decreasing the wearing of cylinder surfaces engaged by the pistons. It has also been known to insert wear resistant liners on the cylinders of high performance engines having light alloy housings in order to provide better wearing characteristics at the regions wherein the piston rings engage the cylinder walls in order to maintain the high performance of the engine. The light alloy materials are relatively soft materials and are greatly affected by temperature variations and generally have proven unsatisfactory from a wearing standpoint at the cylinder walls. Therefore, various means have been proposed to overcome these drawbacks in order to increase the life of the cylinder walls. One such means which has been used is the casting of an aluminum housing around a gray cast iron liner. While some attempts have proven generally satisfactory in some applications to reciprocating combustion engines, it has been found that due to the contact loading of the apex seals, the non-uniform heat dissipation and gas loading present in rotating combustion engines, as will be discussed more fully hereinafter, these prior methods are not always satisfactory when used in providing a liner means in rotary combustion engines since the liners tend to separate from the light alloy housings and the wearing characteristics have not been adequate.

It is therefore the purpose of this invention to provide a more satisfactory liner for a light alloy housing of a rotating combustion engine. The invention is generally carried out by casting the aluminum housing around an intermediate layer or spraying said layer onto a cast or forged housing. The intermediate layer is formed from a metal having good bonding characteristics with the light alloy material of the housing and having a relative hardness greater than that of the housing base metal. The outer surface of the liner is formed from a thin layer of high wear resistant metal having low friction characteristics which is deposited on the intermediate layer and the combination of these layers serves to make up a liner for the inner surface for the rotating combustion engine which is relatively long lasting, will not separate from the light alloy housing and therefore, will also reduce wearing of the apex seal strips. The outer surface of the liner will hereinafter be referred to as the inner layer since the relative position in the engine housing is radially inward with respect to the intermediate layer and the axis of the housing.

Accordingly it is one object of the invention to provide a novel housing for a rotating combustion engine having a novel inner surface which has high wear resistant and low friction characteristics.

It is further an object of the invention to provide a light alloy housing for a rotating combustion engine having an improved liner construction on its inner surface which increases the life of the inner surface over that of prior light alloy housings.

It is an additional object of the invention to provide a liner construction for the inner surface of a light alloy housing in a rotating combustion engine, said liner construction having good bonding characteristics with the light alloy housing and an inner surface having high wear resistant and low friction characteristics.

It is also an object of the invention to provide a multilayer liner for the inner surface of a light alloy housing in a rotating combustion engine wherein said liner has an intermediate layer having good bonding characteristics with the light alloy housing and a relative hardness greater than that of said housing and a thin inner layer deposited on said intermediate layer having high wear-resistant and low friction characteristics.

It is further an object of the invention to provide a novel and improved liner construction for the inner surface of the rotor housing in a rotary combustion engine said liner having high wear resistant and low friction characteristics and being capable of maintaining the true shape of said inner surface during engine operation.

It is another object of the invention to increase the life of the apex seal members in the rotor of a rotary combustion engine by providing a hard-wear-resistant liner with low friction characteristics on the inner surface of the rotor housing engaged by said apex seal members which will substantially maintain the true shape of said inner surface during engine operation thereby preventing uneven wear of said apex seal members.

It is an additional object of the invention to provide a liner having a relatively thin intermediate layer, bonded to the inner surface of the rotor housing in a rotary combustion engine wherein the thickness of the intermediate layer does not inhibit heat conduction and the temperature difference through the layers of said liner is relatively small.

It is still another object of the invention to provide an effective light weight and strong housing for a rotary combustion engine having relatively low cost of production and maintenance.

Figure 2:
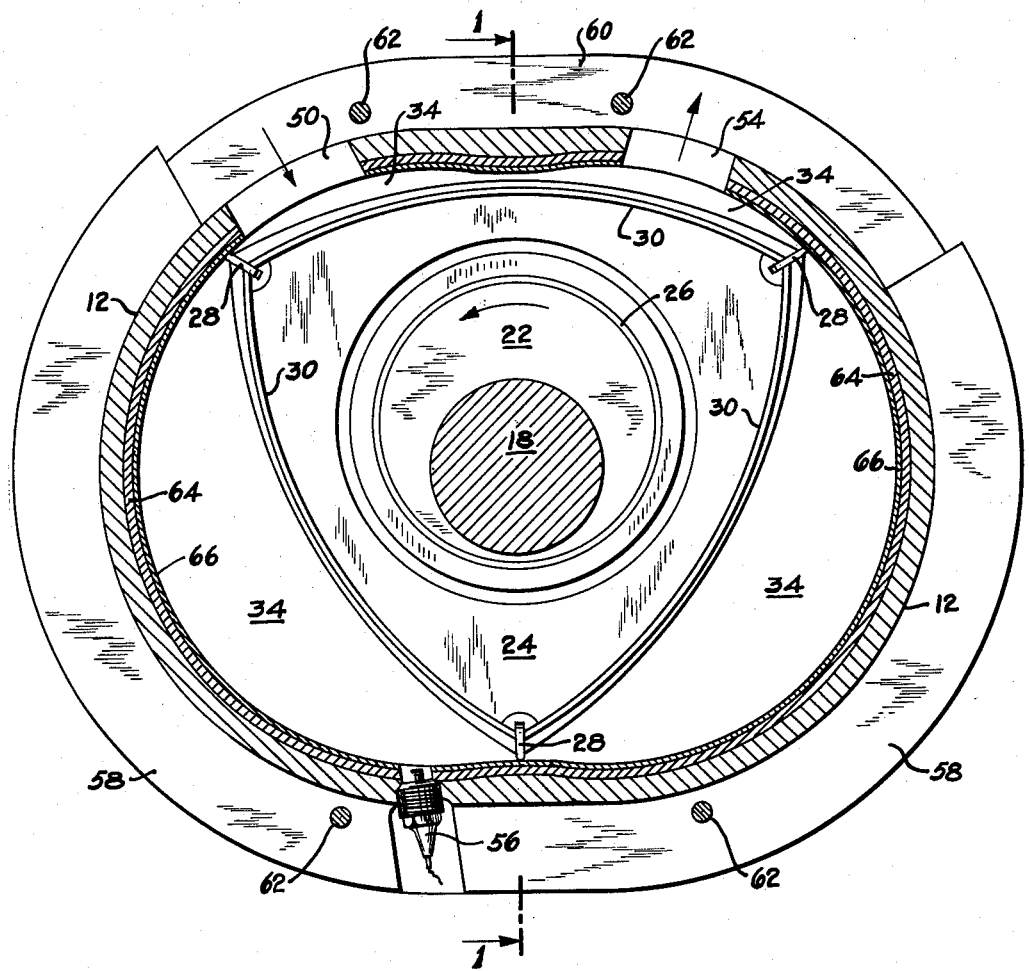

Other advantages and objects of the invention will be apparent upon reading the following detailed description with the accompanying drawings wherein:

FIG. 1 is a sectional view of a rotary combustion engine embodying the present invention, FIG. 2 is a sectional view taken along line 2—2 of FIG. 1.

In rotary combustion engines of the type described, the life of the inner surface of the peripheral wall may be affected by the constant rubbing and variable loading of the seal strips which may cause substantial wearing of the inner surface and the seal strips. Also, the varying gas loads present acting on the peripheral wall inner surface and on the apex seal strips to vary their engagement with the inner surface and the variations in heat flux produced during operation tend to distort the inner surface and may cause a separation of the liner from the main housing. Due to the fact that combustion and expansion always take place in the same region of the engine, this region is subject to high heat flux while in the region of the intake means the engine is subject to very little heat flux. So it can be seen that there is a great degree of variation in the heat input in the engine which leads to a differentiation in the expansion and contraction of the peripheral wall between the relatively hot regions of the engine and the relatively cool regions of the engine. Also, because the states of combustion and expansion take place inside the engine between the outer face of the rotor and the inner surface of the peripheral wall, the inner surface becomes relatively hot while the outer surface is cool and therefore, it can be seen that there is a large temperature variation between the inner surface of the peripheral wall and its outer surface which may result in a tendency of the peripheral wall to distort, if not properly compensated for. If a thick cast iron liner is used, as suggested above, the temperature difference is even greater and therefore the thermal stresses and distortion are higher. In addition, there is a variation in the gas loads and centrifugal forces in the engine which may also affect the wearing of the peripheral wall inner surface and the apex seal strips. For example, when using a three-lobed rotor with a two-lobed epitrochoid, three working chambers will be formed between the outer face of the rotor and the inner surface of the peripheral wall and while gases are being compressed in one working chamber, combustion and expansion is taking place in a second chamber while in the third chamber gases are being exhausted. These varying states of engine operation lead to a large changing of gas pressures and variation in centrifugal forces in the engine which result in the apex seal strips being forced against the inner surface of the peripheral wall in response to large gas pressures and centrifugal forces at one point while at another point relatively small gas pressures and centrifugal forces are forcing the apex seal strips to engage the inner surface. Therefore, the varying forces may indirectly cause uneven wearing of the inner surface and the seal strips and the mobile engaging action of the seal strips with the inner surface may be affected, for example, by jamming of the seal strips in their mounting grooves. So it can be seen, that unique problems are present in rotary combustion engines with respect to wear of the engine inner surface engaged by the seals which are not normally found in reciprocating combustion engines. Also, if there is high friction between the inner surface and the seal strips the seal operation would be greatly inhibited which may result in power loss, increase in fuel consumption and deterioration of engine performance and also a high rate of wearing of the seal strips would result.

An engine housing formed of a light alloy material without any surface treatment on the seal engagement surfaces has been found to be unsuitable except in some applications in low performance engines. Due to the unique problems present in rotary combustion engines, the solutions generally proposed in reciprocating combustion for eliminating wear are not normally available. For example, due to the high heat and pressure variations in rotary combustion engines, when using a cast iron liner, the light alloy material may locally separate from the liner which may result in fatigue of the liner, may affect the heat dissipation between the liner and the housing and the shape of the inner surface may change thereby causing uneven wear of the apex seal strips. Even when applying the best known methods presently used to bond iron to aluminum, the liner broke and peeled away from the housing when tested in a high performance rotary combustion engine. It has been proposed that the inner surface of the peripheral wall be plated with chromium or a chromium composition deposited directly on the light alloy housings. However, it has been found that the bonding or adhesion between the chromium layer and the light alloy housing is not always satisfactory, for the same reasons mentioned above, and further the light alloy housing does not always provide a good backing for the chromium layer which may result in distortion and cracking of said layer and therefore, in order to obtain any satisfactory results without a breaking up of the layer, it has been found that the chromium layer normally has to be made relatively thick. Using a relatively thick chromium layer is very expensive and therefore, from a commercial standpoint is undesirable. However, because chromium has high wear-resistant and low friction characteristics, it is desirable material for use as a liner for the inner surface of the peripheral wall in rotary combustion engines. Also, because of the light weight characteristics of the light alloy materials mentioned above and their relative ease of fabrication, their use in an engine housing is desirable providing the wearing characteristics of their inner surface can be improved.

A further proposal for a liner for the inner surface was the use of a single layer of molybdenum, iron or steel. It was found however, that the molybdenum, iron and steel liners did not adequately adhere to the light alloy housing and would break away, particularly in the relatively hot zones of the housing. Further, the working surface of these liners was relatively rough, which is obviously undesirable for efficient operation, and the rate of wear and breakage of the liner and of the apex seals was beyond practical limits. These liners made of a single layer of molybdenum, iron or steel are usually sprayed on, as will be explained below, and the breaking away of these liners is caused and/or accelerated by the varying loading of the apex seals, the relatively high friction characteristics of these layers, the hot combustion gases attacking the layer and the bond with the housing and the accompanying corrosive effects of these hot gases with the above-mentioned materials, and from moisture penetration, fuel and oil penetration and various deposits on said surface. These detrimental effects are brought about due to the fact that, when these materials are deposited on the housing base material, individual small globules of the deposited material are formed which break away from the surface and cause the surface to become rougher and have openings or pits therein. It has been found that depositing a thin chrome layer on top of this layer of molybdenum, iron or steel eliminates the above-mentioned detrimental effects, as well as providing other benefits, as will be discussed further below. From the following detailed description it will be apparent that light alloy housings may be satisfactorily utilized in rotary combustion engines when provided with the rotor housing liner of the invention.

With reference to FIGS. 1 and 2 of the drawings, there is shown a sectional view of a rotary combustion engine generally designated at 10. The rotary combustion engine 10 comprises an outer body formed by a peripheral wall or rotor housing 12 interconnected with end housings 14 and 16 to form a cavity. As viewed in FIG. 2, the contour of the inner surface of the peripheral wall 12 has a multi-lobe (two-lobe) profile which preferably is basically a two-lobed epitrochoid. A shaft 18 is rotatably supported within the outer body by suitable bearings 20 and has an eccentric portion 22 formed thereon. Rotatably supported on the eccentric 22 is rotor 24, having a suitable bearing 26 therebetween, said rotor having a plurality of circumferentially-spaced apex portions in each of which there is mounted a radially-movable apex seal strip 28. The rotor 24 shown in FIG. 2 has three lobes joining together to form three apex portions on the rotor. It is of course to be understood that the invention is not limited to a two lobed cavity and rotor having three apex portions and it is intended that other combinations may be used, for example, a three lobed cavity with a rotor having four apex portions.

Seals 30 are provided within each of the side faces of the rotor for sealing engagement with the inner surfaces of the end housings 14 and 16 and mate with intermediate seal bodies 32, which also aid in supporting the apex seal strips 28 in each of the apex portions, thereby forming a continuous seal for each of the working chambers 34 being defined between the apex portions of the rotor and the inner surface of the peripheral wall. As the rotor and outer body rotate relative to one another, the working chambers 34, being defined between the apex portions of the rotor and the inner surface of the peripheral wall, vary in volume.

An internally-toothed gear 36 is mounted on the rotor 24 through bosses 38 on the rotor 40 on the gear and fastened by suitable bolts 42, said gear 36 being in meshing engagement with an externally-toothed gear 44 to guide the rotor in tracing its epitrochoidal path. The gear 44 has a sleeve portion 46 which surrounds the shaft 18 providing a bearing support for said shaft and has a radially extending flange portion 48 through which suitable bolts 50 pass to fasten the gear 44 to the end housing 16.

An intake portion 52 is provided for admitting air or a fuel-air mixture in order to supply the combustion zone of the engine. An exhaust port 54 is provided for expelling the burnt gases from the engine and an ignition means 56 may be provided for ignition of the fuel-air mixture, which may be eliminated if the engine is run on the diesel cycle, whereby it can be seen that the stages of intake, compression, expansion, and exhaust may be carried out. Axially-spaced cooling fins 58 may be provided on the peripheral wall 12 in the region of the engine wherein the greatest heat is produced and extend circumferentially around a portion of the rotor housing and in the region having no cooling fins axially-spaced supporting ribs 60 may be provided and along with cooling fins 58 aid in keeping the rotor housing rigid during engine operation.

As illustrated and disclosed in copending application, Serial No. 211,997, entitled "Housing Construction for Rotary Mechanisms" by Charles Jones and assigned to the same assignee as the present application, the peripheral wall 12 or the rotor housing preferably extends beyond the width of the rotor. With this construction female pilot sections are formed on the peripheral wall 12 on both sides of the rotor into which extend male pilot sections formed on the end housings 14 and 16. Said male pilot sections fit snugly into the female pilot sections, and the end housings are bolted to the rotor housing by suitable bolts, such as that shown at 62 in FIG. 1 with a suitable gasket 63 interposed between the housings to prevent any gas leakage therebetween. The fins 58 and ribs 60 extend axially across the entire width of the peripheral wall for reasons clearly disclosed in said copending application and are provided circumferentially around the housings in the regions wherein relatively high heat is generated, for example, in the regions of combustion and expansion.

In accordance with the present invention the rotor housing is preferably formed from a light alloy material such as aluminum, aluminum alloy, magnesium or magnesium alloy and, for reasons explained above, the inner surface of the peripheral wall is provided with a liner to increase the wear life of the inner surface and of the apex seal strips. The light alloy housing has an intermediate layer 64 bonded to its inner surface by a suitable well known method, which will be more fully explained hereinafter. The intermediate layer 64 may be formed from molybdenum, iron or steel or a combination thereof or from refractory materials such as, chromium carbides, tungsten carbides or aluminum oxides, all of which have good bonding characteristics with the light alloy housing and provide a surface of relatively greater hardness than the inner surface of the light alloy housings.

Several methods have been found satisfactory in providing the light alloy housing with the intermediate layer 64. The intermediate layer may be separately cast by centrifugal casting or by spraying the intermediate layer onto a mandrel having a suitable parting compound thereon. The mandrel is designed so that its outer surface substantially defines the shape of the housing cavity. The light alloy housing is then cast around the preformed intermediate layer and, in the method wherein the mandrel is used, the mandrel is then removed leaving the intermediate layer securely bonded to the housing. Another method which may be used is forming the housing first by casting or forging and then spraying the material of the intermediate layer onto the rough inner surface or using a flame spraying or flame plating process to deposit the material of the intermediate layer onto the rough inner surface of the housing all of which are known processes. The intermediate layer is made relatively thin so that it will not be subject to large thermal stresses which would be the case if this layer were relatively thick due to the relative temperatures between the inner and outer surface of the layer.

After bonding of the intermediate layer 64 to the housing, a relatively thin inner layer 66 of high-wear-resistant metal, preferably chromium or a chromium alloy or other metals which are capable of high wear resistant characteristics and provide a good coating for the molybdenum, iron or steel layer, as described above, under the unique heat and gas pressure problems present in rotary combustion engines of the type described, is then deposited onto the intermediate layer 64 to form a hard, smooth, wear-resistant relatively low-friction surface for engagement by the apex seal strip 28 which does not form surface globules that may break away, as in the case described above. For example, the chromium layer may be deposited on the intermediate layer by electroplating or some other suitable method.

In the above structure the drawbacks present in light alloy housings are substantially eliminated. As a result of present invention, only a relatively thin layer of chromium need be provided which substantially reduces the cost of the housings over prior proposals of a single relatively thick layer of chromium, because the major portion of the liner or the intermediate layer 64 may be formed by a metal having a much lower manufacturing cost than the inner chromium layer. Using a relatively thick chromium liner without an intermediate layer has proven unsatisfactory in prior proposals because of the high cost of the metal itself, the costs of depositing a thick layer of this metal and the inner surface must be grinded before depositing the chromium and the chromium layer must be ground after depositing. In the present invention however, due to the fact that the molybdenum or steel intermediate layer 64 has a relative hardness greater than that of the aluminum housing and because the intermediate layer has good bonding characteristics with the aluminum housing, a good backing is provided for the chromium layer which will maintain the true epitrochoidal shape of the inner surface and be substantially free from separation problems and therefore only enough chromium need be plated on the intermediate layer to provide a thin, hard wear resistant coating. The chromium layer is deposited so thin that grinding of this layer after depositing has been found to be unnecessary and only a honing to smoothen the surface is required. The thickness of the inner layer needed to provide satisfactory performance has been found to be in the neighborhood of 0.0001" to 0.002" while the thickness of the intermediate layer may be in the neighborhood of 0.005" to 0.040" when the housing is cast around the intermediate layer and 0.005″ to 0.020″ when the intermediate layer is sprayed onto the cast housing, both processes having been explained above. The thickness of the layers has been greatly exaggerated in the drawings for purposes of more clearly illustrating the invention.

In FIGS. 1 and 2 it can be seen that the liner on the inner surface of the peripheral wall serves to make up the preferred inner contour of said inner surface. In FIG. 1 it can be seen that the liner extends in an axial direction across the entire width of the peripheral wall which, as mentioned above, is substantially greater than that of the rotor 24. The purpose for extending the liner to this width is clearly set forth in the above-mentioned copending application wherein it is explained that, due to this axial extending of the liner, no corners will be formed between the edges of the liner and the engaging apex seal strip 28 thereby preventing any chipping of the liner which sometimes occurred in previous embodiments of rotary combustion engines having these corner formations. Other advantages of the pilot construction are clearly set forth in said copending application.

Thus, it can be seen that, by the structure of the present invention, light alloy housings can be now provided in rotary combustion engines, which will give satisfactory performance, will be relatively easy to fabricate and will be light in weight. The present invention overcomes the drawbacks of prior proposals for liners in light alloy housings of rotary combustion engines which, due to the unique heat and gas load problems present in this type of engine did not always perform satisfactorily. The liner disclosed herein is substantially free from the problem of separation from the housing even under high engine output operation and further requires only a relatively thin layer of high-wear-resistant metal such as chromium on the inner surface. The liner provides a hard, long lasting surface for the rotor housing which will substantially hold the true shape of the inner surface and will not cause uneven wear of the apex seal strips thereby also adding to the running life of these elements. It should also be understood that the application of the liner of the invention is not limited to the inner surface of the rotor housing but may also be provided on the inner surface of the end housings 14 and 16 which are engaged by side seals 30 and, as stated above, the liner of the invention is equally applicable to other rotary mechanisms.

While the invention has been set forth in detail in the above description, it should be understood that the invention is not to be limited by the specific detail set forth therein and that various modifications and changes may be made by those skilled in the art without departing from the spirit and scope of the invention as defined in the following claims.

I claim:

1. In a rotary mechanism having an outer body comprising a peripheral wall interconnected with a pair of end walls forming a cavity and the inner surface of said peripheral wall having a multi-lobe profile, a rotor rotatably mounted within said cavity, a plurality of circumferentially-spaced radially movable seal strips carried by said rotor for sealing engagement with the inner surface of said peripheral wall thereby forming a plurality of working chambers which upon relative rotation of said outer body and said rotor vary in volume, intake means and exhaust means provided in said mechanism; said peripheral wall being formed of a light alloy material selected from the group consisting of aluminum, magnesium, aluminum alloy and magnesium alloy and having a multilayer liner on the inner surface thereof, said multi-layer liner comprising an intermediate layer securely bonded to the entire inner surface of said peripheral wall and having a relative hardness greater than that of said peripheral wall and a thin inner layer of high wear resistant material deposited on said intermediate layer and said multi-layer liner substantially identically conforming to the inner contour of said peripheral wall.

2. In a rotary mechanism as recited in claim 1 wherein said thin inner layer comprises a metal whose major constituent is chromium.

3. In a rotary mechanism as recited in claim 1 wherein said intermediate layer is made of a material selected from the group consisting of molybdenum, iron, steel, chromium carbide, tungsten carbide and aluminum oxide.

4. In a rotary mechanism as recited in claim 1 wherein said intermediate layer is made of a material selected from the group consisting of molybdenum, iron, steel, chromium carbide, tungsten carbide and aluminum oxide and said inner layer is made of chromium.

5. In a rotary mechanism as recited in claim 4 wherein said peripheral wall is cast around said intermediate layer, said intermediate layer having a thickness in the range of 0.005″ to 0.040″ and said inner layer having a thickness in the range of 0.0001″ to 0.002″.

6. In a rotary mechanism as recited in claim 4 wherein said intermediate layer is sprayed onto said peripheral wall inner surface, said intermediate layer having a thickness in the range of 0.005″ to 0.020″ and said inner layer having a thickness in the range of 0.0001″ to 0.002″.

7. In a rotary mechanism as recited in claim 1 wherein the peripheral wall extends beyond the width of said rotor and said multi-layer liner covers the entire width of the inner surface of said peripheral wall and said multi-lobed profile of inner surface of said peripheral wall preferably is basically an epitrochoid.

8. In a rotary mechanism as recited in claim 7 wherein said intermediate layer is made of a material selected from the group consisting of molybdenum, iron, steel, chromium carbide, tungsten carbide and aluminum oxide and said inner layer is made of chromium.

References Cited in the file of this patent

UNITED STATES PATENTS

| | | |
|---|---|---|
| 1,720,815 | Bendix | July 16, 1929 |
| 2,058,143 | Flanders | Oct. 20, 1936 |
| 2,816,513 | Watson | Dec. 17, 1957 |
| 2,925,786 | Hill | Feb. 23, 1960 |
| 2,933,046 | McCray | Apr. 19, 1960 |
| 3,012,550 | Paschke | Dec. 12, 1961 |

FOREIGN PATENTS

| | | |
|---|---|---|
| 1,133,762 | France | Nov. 19, 1956 |

OTHER REFERENCES

SAE Journal, September 1959, "Aluminum Engine Cylinders," by A. F. Bauer, pp. 38–40.

SAE Journal, April 1961, "4 New Aluminum Cylinder Blocks," pp. 42–48.

SAE Paper No. 369A, 1961 Summer Meeting, "Metallurgical Bonding in Cylinder Construction," by M. G. Whitfield.

SAE Paper No. 369B, 1961 Summer Meeting, "The Development of Tibon Hard Chrome Plated Cylinder Bores," by L. W. Raymond and A. K. Wood.

SAE Paper No. 369C, 1961 Summer Meeting, "Transplant Coated Aluminum Cylinder Bores—Physical Properties of this New Protective Coating in Comparison to Known Processes," by A. F. Bauer.